US011317146B2

(12) United States Patent
Hardt et al.

(10) Patent No.: US 11,317,146 B2
(45) Date of Patent: Apr. 26, 2022

(54) VIEWER IDENTIFICATION BASED ON WIRELESS DEVICE PROXIMITY

(71) Applicant: ARRIS Enterprises LLC, Suwanee, GA (US)

(72) Inventors: Charles Hardt, Lawrenceville, GA (US); Dmitry Barablin, Lawrenceville, GA (US); Scott Stilwell, Lawrenceville, GA (US)

(73) Assignee: ARRIS Enterprises LLC, Suwanne, GA (US)

( * ) Notice: Subject to any disclaimer, the term of this patent is extended or adjusted under 35 U.S.C. 154(b) by 0 days.

(21) Appl. No.: 16/419,328

(22) Filed: May 22, 2019

(65) Prior Publication Data

US 2019/0306572 A1    Oct. 3, 2019

Related U.S. Application Data

(63) Continuation of application No. 15/061,441, filed on Mar. 4, 2016, now Pat. No. 10,341,724.

(51) Int. Cl.
| | |
|---|---|
| *H04N 21/2668* | (2011.01) |
| *H04N 21/442* | (2011.01) |
| *H04N 21/81* | (2011.01) |
| *H04W 64/00* | (2009.01) |
| *H04N 21/436* | (2011.01) |
| *H04W 84/12* | (2009.01) |

(52) U.S. Cl.
CPC .. *H04N 21/44218* (2013.01); *H04N 21/43615* (2013.01); *H04N 21/812* (2013.01); *H04W 64/003* (2013.01); *H04N 21/2668* (2013.01); *H04W 84/12* (2013.01)

(58) Field of Classification Search
CPC ................................................. H04N 21/2668
See application file for complete search history.

(56) References Cited

U.S. PATENT DOCUMENTS

| | | | |
|---|---|---|---|
| 9,501,786 B1 | 11/2016 | Kerr et al. | |
| 2006/0291471 A1* | 12/2006 | Heuer | H04L 51/28 370/395.5 |
| 2009/0280824 A1* | 11/2009 | Rautiainen | G01S 5/14 455/456.1 |
| 2010/0122305 A1* | 5/2010 | Moloney | H04N 21/2225 725/93 |

(Continued)

*Primary Examiner* — Michael H Hong
(74) *Attorney, Agent, or Firm* — Buchanan, Ingersoll & Rooney PC

(57) ABSTRACT

Methods, systems, and computer readable media can be operable to facilitate an identification of a viewer based upon the proximity of an associated wireless device to an access point. An association between a wireless device, user, display device, and a position of the wireless device relative to an access point may be created and stored at the access point. The access point may monitor the position of the wireless device, wherein the position is based on the strength of a signal received from the wireless device at one or more receivers. When the access point determines that a position of the wireless device is associated with a display device, the access point may identify the user of the wireless device as a potential viewer of the display device. Targeted advertisements and set-top box functionality may be configured based on the identification of a viewer of the display device.

20 Claims, 9 Drawing Sheets

(56) References Cited

U.S. PATENT DOCUMENTS

| | | | |
|---|---|---|---|
| 2014/0096042 A1* | 4/2014 | Travis | G06F 3/0483 |
| | | | 715/760 |
| 2015/0201438 A1* | 7/2015 | Adarapu | H04L 67/02 |
| | | | 370/328 |
| 2015/0381740 A1* | 12/2015 | Gwin | H04W 12/068 |
| | | | 709/228 |
| 2016/0073162 A1* | 3/2016 | Cooperstein | H04N 21/25 |
| | | | 725/114 |

* cited by examiner

VIEWER IDENTIFICATION BASED ON WIRELESS DEVICE PROXIMITY

CROSS REFERENCE TO RELATED APPLICATION

This application is a continuation of U.S. application Ser. No. 15/061,441, entitled "Viewer Identification Based on Wireless Device Proximity," which was filed on Mar. 4, 2016.

TECHNICAL FIELD

This disclosure relates to the identification of a viewer based on the proximity of a wireless device to an access point.

BACKGROUND

With the advent of targeted advertising and personalized delivery of multimedia services to a user, the ability to identify a multimedia consumer has become even more important. Content and service providers continue to search for a simple yet accurate method for determining who is viewing a particular display device at a given time. Currently a viewer may be identified based on the content that is being delivered to a display device. For example, targeted advertising may be geared toward children when content associated with children is being delivered to the display device. However, content type is not always an accurate mechanism for determining who is currently viewing a display device. For example, there are plenty of types of content that are gender and age neutral.

Currently customer premise equipment (CPE) devices such as a set-top box (STB) may be configured to provide personalized interfaces, guides, and/or services based on the user that is currently accessing content from the device. For example, certain features (e.g., parental control) and guide options (e.g., favorites list) may be enabled through a STB when the STB is informed as to who is currently accessing content from the STB. However, currently, a user must inform the STB of the user's identity in order to enable these personalized features, and it is likely that a user will access a STB without updating the identity of the current STB user. Therefore, it is desirable to improve upon methods and systems for identifying a viewer of a display device.

BRIEF DESCRIPTION OF THE DRAWINGS

Like reference numbers and designations in the various drawings indicate like elements.

DETAILED DESCRIPTION

Figure 1:
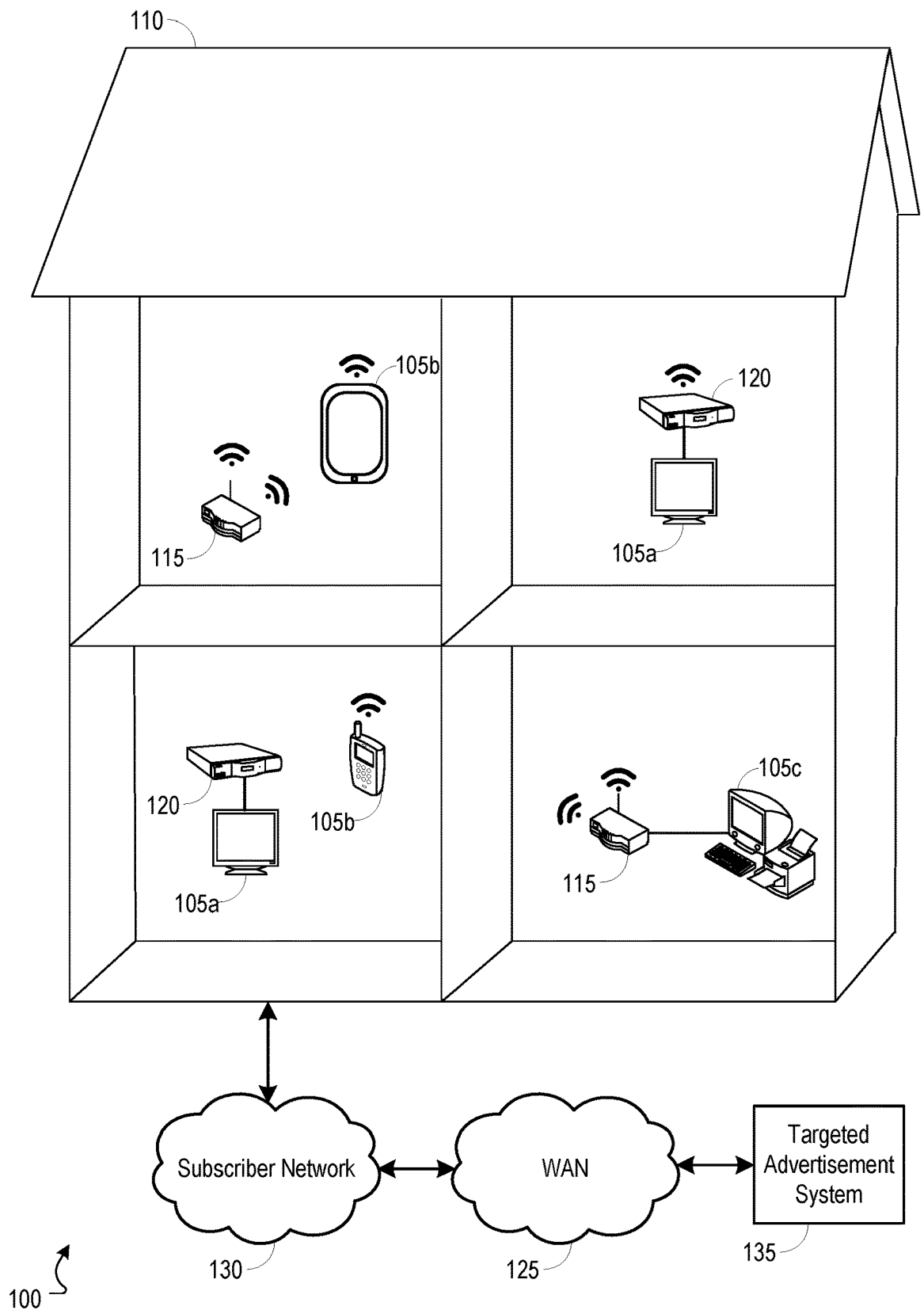
FIG. 1 is a block diagram illustrating an example network environment operable to identify a viewer based upon the proximity of an associated wireless device to an access point.

It is desirable to improve upon methods and systems for identifying a viewer of a display device. Methods, systems, and computer readable media can be operable to facilitate an identification of a viewer based upon the proximity of an associated wireless device to an access point. An association between a wireless device, user, display device, and a position of the wireless device relative to an access point may be created and stored at the access point. The access point may monitor the position of the wireless device, wherein the position is based on the strength of a signal received from the wireless device at one or more receivers. When the access point determines that a position of the wireless device is associated with a display device, the access point may identify the user of the wireless device as a potential viewer of the display device. Targeted advertisements and set-top box functionality may be configured based on the identification of a viewer of the display device.

An embodiment of the invention described herein may include a method comprising: (a) measuring the strength of a signal between a wireless client device and one or more receivers, wherein the wireless client device is associated with a first user; (b) based upon the measured strength of the signal between the wireless client device and the one or more receivers, determining a position of the wireless client device relative to an access point, wherein the position of the wireless client device relative to the access point comprises a distance between the wireless client device and the access point and a direction of the wireless client device with respect to the access point; (c) determining that the position of the wireless client device relative to the access point is associated with a display device; and (d) identifying the first user as a potential viewer of the display device.

According to an embodiment of the invention, the association between the display device and the position of the wireless client device relative to the access point is created and stored at the access point when the signal strength between the wireless client device and one or more receivers is measured and stored in response to a message received from the wireless client device, and the message comprises an identification of the wireless client device and the display device.

According to an embodiment of the invention, the method described herein further comprises outputting a notification to a media device delivering content to the display device, wherein the notification informs the media device that the first user is a potential viewer of the display device.

According to an embodiment of the invention, the notification comprises profile information associated with the first user.

According to an embodiment of the invention, the notification is output to the media device after the position of the wireless client device relative to the access point has been constant for a predetermined duration of time.

According to an embodiment of the invention, the method described herein further comprises: (a) taking a subsequent measurement of the strength of a signal between the wireless client device and one or more receivers; (b) based upon the subsequent measurement of the strength of the signal between the wireless client device and the one or more receivers, determining a current position of the wireless client device relative to the access point, wherein the current position of the wireless client device relative to the access point is not associated with the display device; and (c) outputting a notification to the media device, wherein the notification informs the media device that the first user is no longer a potential viewer of the display device.

According to an embodiment of the invention, the method described herein further comprises outputting a notification to a targeted advertisement system, wherein the notification identifies the first user as a potential viewer of the display device.

An embodiment of the invention described herein may include an apparatus comprising: (a) one or more receivers configured to be used to receive a signal from a wireless client device, wherein the wireless client device is associated with a first user; (b) a module configured to: (i) measure the strength of the signal received from the wireless client device; (ii) based upon the measured strength of the signal received from the wireless client device, determine a position of the wireless client device relative to the one or more receivers, wherein the position of the wireless client device relative to the one or more receivers comprises a distance between the wireless client device and the one or more receivers and a direction of the wireless client device with respect to the one or more receivers; (iii) determine that the position of the wireless client device relative to the one or more receivers is associated with a display device; and (iv) identify the first user as a potential viewer of the display device.

An embodiment of the invention described herein may include one or more non-transitory computer readable media having instructions operable to cause one or more processors to perform the operations comprising: (a) measuring the strength of a signal between a wireless client device and one or more receivers, wherein the wireless client device is associated with a first user; (b) based upon the measured strength of the signal between the wireless client device and the one or more receivers, determining a position of the wireless client device relative to an access point, wherein the position of the wireless client device relative to the access point comprises a distance between the wireless client device and the access point and a direction of the wireless client device with respect to the access point; (c) determining that the position of the wireless client device relative to the access point is associated with a display device; and (d) identifying the first user as a potential viewer of the display device.

FIG. 1 is a block diagram illustrating an example network environment 100 operable to identify a viewer based upon the proximity of an associated wireless device to an access point. In embodiments, video, voice, and/or data services may be delivered to one or more client devices 105. Client devices 105 may include a television 105a, mobile wireless device 105b (e.g., mobile telephone, tablet, etc.), computer 105c, gaming console, wearable device (e.g., smart watch, glasses, etc.) and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

Multiple services may be delivered to client devices 105 within a subscriber premise 110 over one or more local networks (e.g., coaxial network, a local area network (LAN), wireless local area network (WLAN), personal area network (PAN), Multimedia over Coax Alliance (MoCA) network, mobile hotspot network, and any other interconnectivity operable to route communications to and from client devices 105), and delivery of the multiple services may be facilitated by one or more access devices. Central devices may include any device configured to receive and/or deliver communications or services to one or more client devices 105. For example, access devices may include an access point 115 (e.g., gateway device, router, wireless extender, etc.), a set-top box (STB) 120, and others. It should be understood that one or more central devices may be integrated with each other or with other devices. For example, a client device 105 or STB 120 may operate as a station or an access point.

It should be understood that delivery of the multiple services over the local network(s) 110 may be accomplished using a variety of standards and formats. It will be appreciated by those skilled in the relevant art that client devices 105 may be capable of interacting and communicating with each other and/or with a central device over various wired and wireless communication standards (e.g., Wi-Fi, Bluetooth, etc.).

Multiple services may be provided to a subscriber premise 110 from a WAN 125 through a subscriber network 130. The subscriber network may include, for example, a hybrid fiber-coaxial (HFC) network, fiber network, mobile network, and any other network operable to deliver services to a subscriber premise 110.

In embodiments, an access point 115 may log an association between the location of a wireless client device (e.g., mobile wireless device 105b) and a display device (e.g., television 105a, computer 105c, etc.). An access point 115 may receive a learn location command from a wireless client device while the wireless client device is located at or near in proximity to a display device. For example, a user may output a learn location command from the wireless client device to the access point 115 while the user is located at a certain proximity to a display device (e.g., from a couch, recliner, etc.), and the learn location command may identify the display device (e.g., user may input a unique identifier of the display device). When the access point 115 receives a learn location command from the wireless client device, the access point 115 may determine a proximity of the wireless client device to the access point 115 and a direction of the wireless client device relative to the access point 115. The access point 115 may determine the proximity of the wireless client device by measuring the strength of a signal received from the wireless client device at the access point 115. The access point 115 may determine a relative direction of the wireless client device by measuring the strength of a signal received from the wireless client device across a plurality of antennas or across a plurality of segments of a single antenna. For example, the location of the wireless client device may be triangulated using the measured signal strengths at each of the plurality of antennas. It should be understood that the plurality of antennas may be located at a single access point or may be located across a plurality of access points (e.g., the premise 110 may include multiple access points 115).

An access point 115 may store an association between a wireless client device, a user of the wireless client device, a display device, a proximity, and a relative direction. For example, the proximity and relative direction may be a logged proximity and relative direction of the wireless client device as measured when the wireless client device was previously located at or near in proximity to the display device and a learn location command was output to the access point.

In embodiments, an access point 115 may monitor the location of a wireless client device within the premise 110 and may recognize when the wireless client device is located at or near in proximity to a certain display device. For example, the access point 115 may compare a monitored proximity (e.g., signal strength) and relative direction (e.g., signal strengths at each of a plurality of certain antennas) of the wireless client device with proximities and corresponding relative directions logged for the wireless client device. If the access point 115 determines that the monitored location of the wireless client device matches a logged location for the wireless client device, the access point 115 may determine that the wireless client device is currently located at or near a display device that is associated with the logged location for the wireless client device.

In embodiments, when an access point 115 determines that a wireless client device is at or near in proximity to a display device, the access point 115 may inform a CPE device (e.g., STB 120) delivering services to the display device, or the display device itself, that the user associated with the wireless client device is a potential viewer of the display device. The access point 115 may output profile information associated with the user to the CPE device. For example, profile information may include personal information associated with a user associated with the device (e.g., name, gender, age, etc.), preferences associated with the user (e.g., favorite channels, shows, media genres, etc.), privileges afforded the user (e.g., enable/disable parental control, ability to make PPV or VOD purchases, etc.), and/or other information. In embodiments, user profile information may be stored at the CPE device (e.g., STB 120).

In embodiments, when an access point 115 determines that a wireless client device is at or near in proximity to a display device, the access point 115 may inform a targeted advertisement system 135 that the user associated with the wireless client device is a potential viewer of the display device. The access point 115 may output user information to the targeted advertisement system 135, and the user information may include an identification of the user and may include personal information associated with the user (e.g., name, gender, age, etc.), preferences associated with the user (e.g., favorite channels, shows, media genres, etc.), and/or other information that may be used to select appropriate targeted advertisement content that might be relevant to the user. It should be understood that the targeted advertisement system 135 may reside within a back-office or the cloud.

Figure 2:
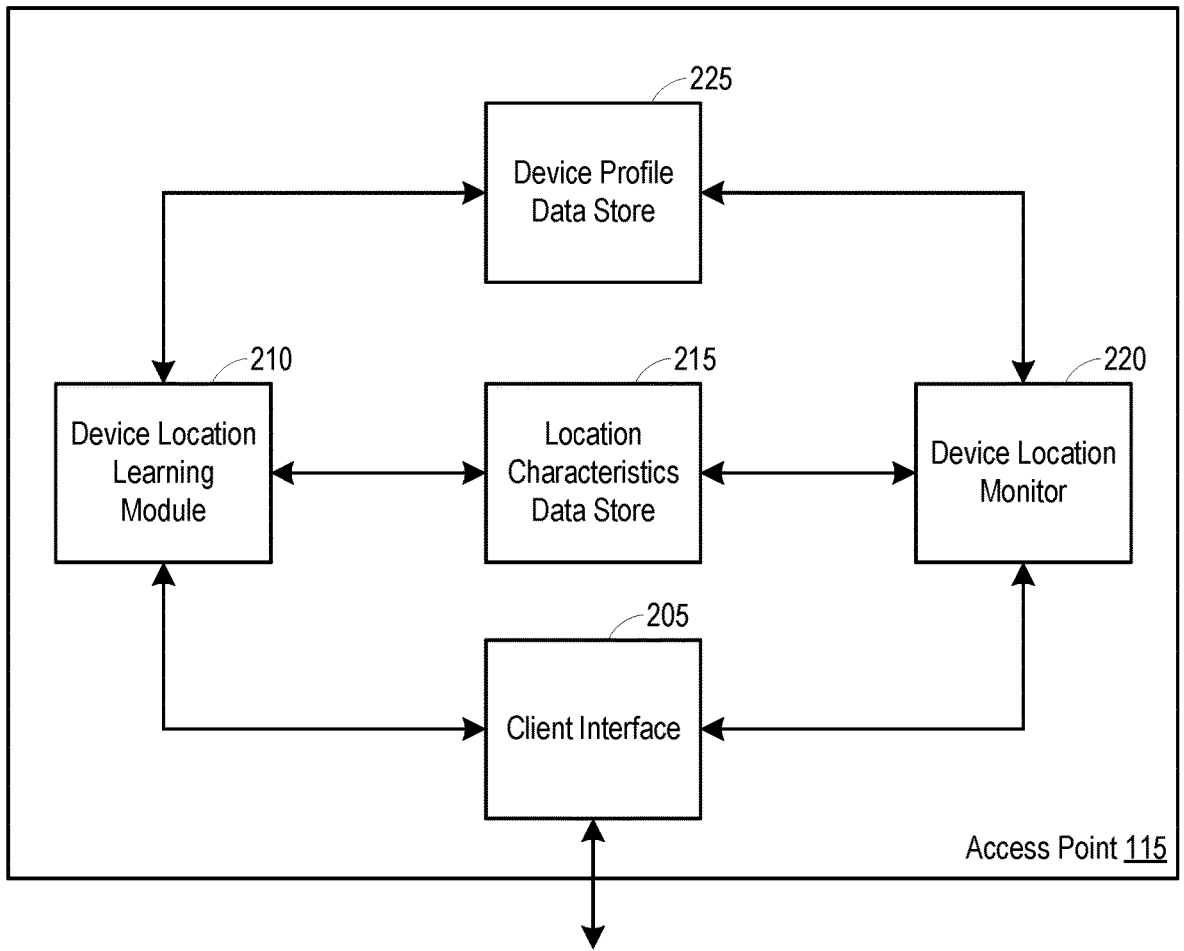
FIG. 2 is a block diagram illustrating an example access point operable to facilitate an identification of a viewer based upon the proximity of an associated wireless device to an access point.

FIG. 2 is a block diagram illustrating an example access point 115 operable to facilitate an identification of a viewer based upon the proximity of an associated wireless device to an access point. The access point 115 may include a client interface 205, a device location learning module 210, a location characteristics data store 215, a device location monitor 220, and a device profile data store 225.

In embodiments, a client interface 205 may provide an interface for facilitating communications between the access point 115 and one or more client devices (e.g., STB 120 of FIG. 1, television 105a of FIG. 1, mobile device 105b, computer 105c, etc.). For example, multiple services may be output from the access point 115 through the client interface 205 and may be delivered to one or more client devices over a local network (e.g., LAN, WLAN, MoCA, etc.). It should be understood that a client interface 205 may be configured to receive and/or output communications using various communication techniques, protocols, and standards (e.g., Ethernet, Wi-Fi, Multimedia over Coax Alliance (MoCA), twisted pair, etc.). Wireless communications may be transmitted to and received from one or more client devices through the client interface 205.

In embodiments, the client interface 205 may include one or more antennas for transmitting and receiving wireless communications. The client interface 205 may include a multiple input/multiple output (MIMO) antenna configuration (e.g., 2×2, 3×3, 4×4, etc.) or a single input/single output (SISO) antenna configuration (e.g., 1×1).

In embodiments, the device location learning module 210 may determine a signal strength and direction of a wireless client device (e.g., mobile device 105b of FIG. 1) relative to the access point 115, and may associate the signal strength and relative direction with a display device. For example, the access point 115 may receive a learn location command from a wireless client device, and the device location learning module 210 can respond to the learn location command by logging the strength of a signal received from the wireless client device along with the relative direction of the wireless client device. The direction of the wireless client device relative to the access point 115 may be determined, for example, by measuring the strength of a signal received from a wireless client device across at least two antennas (or across a plurality of segments of a single antenna). It should be understood that the at least two antennas may be located at a single access point or across a plurality of access points. The measured signal strength coupled with the determined relative direction of the wireless client device may provide an indication of the wireless client device's proximity and direction relative to a display device identified within the learn location command.

In embodiments, the proximity of the wireless client device to the display device may be logged at the location characteristics data store 215. For example, the proximity of the wireless client device to the display device may be stored as an association between the wireless client device, the display device, the measured strength of the signal received from the wireless client device after the reception of the learn location command, and the direction of the wireless client device relative to the access point as determined after the reception of the learn location command. The direction of the wireless client device relative to the access point 115 may be stored as the strength of a signal received from the wireless client device across at least two antennas associated with the access point 115 or the strength of a signal received from the wireless client device across at least one antenna associated with the access point 115 and at least one antenna associated with another access point.

In embodiments, a device profile associated with a wireless client device may be stored at the device profile data store 225. The device profile may include personal information associated with a user associated with the device (e.g., name, gender, age, etc.), preferences associated with the user (e.g., favorite channels, shows, media genres, etc.), privileges afforded the user (e.g., enable/disable parental control, ability to make PPV or VOD purchases, etc.), and/or other information. The device profile information may be retrieved from the wireless client device during the location learning process between the wireless client device and the access point 115. For example, a user may input profile information into the wireless client device, and the profile information may be output to the access point 115 along with the learn location command.

In embodiments, a device location monitor 220 may monitor the location of a wireless client device relative to the access point 115. The device location monitor 220 may monitor the strength of a signal received from the wireless client device at the client interface 205, and a direction of the wireless client device relative to the access point 115. The device location monitor 220 may determine the relative direction of the wireless client device based upon the strength of a signal received from the wireless client device across at least two antennas. It should be understood that the at least two antennas may be located at a single access point (e.g., MIMO antenna configuration) or across a plurality of access points. For example, the location or direction of a wireless client device may be determined based upon a triangulation of the device using the signal strengths received from the device at the different antennas. It should be understood that various types of signals received from a wireless client device may be measured to determine a signal strength and relative direction of the wireless client device. For example, each signal received at the access point 115 from a wireless client device may be measured to determine a current signal strength and relative direction associated with the wireless client device.

In embodiments, while monitoring the signal strength and relative direction of the wireless client device, the device location monitor 220 may compare the monitored signal strength and relative direction of the wireless client device to display device proximity information stored at the location characteristics data store 215. Display device proximity information may include an association between the wireless client device, a user, a display device, a strength of a signal received from the wireless client device, and a direction of the wireless client device relative to the access point 115. The signal strength and relative direction associated with the wireless client device and the display device may be a strength of a signal received from the wireless client device and a relative direction of the device that was logged by the device location learning module 210 in response to receiving a learn location command from the wireless client device while the wireless client device was located at a certain proximity to the display device.

In embodiments, the device location monitor 220 may determine that a monitored wireless client device is located at or near in proximity to a certain display device when the monitored signal strength and relative direction of the wireless client device matches a previously logged signal strength and relative direction associated with the wireless client device and the display device. When the device location monitor 220 determines that a monitored wireless client device is located at or near in proximity to a display device, the device location monitor 220 may output a notification to the display device or a CPE device associated with the display device (e.g., STB 120 of FIG. 1) informing the display device or CPE device that a user associated with the wireless client device is a potential viewer of the display device. The notification that is output to the display device or CPE device may include personal and/or preferential information associated with the user that is associated with the wireless client device (e.g., information associated with a user of a wireless client device may be stored at the device profile data store 225).

Figure 3:
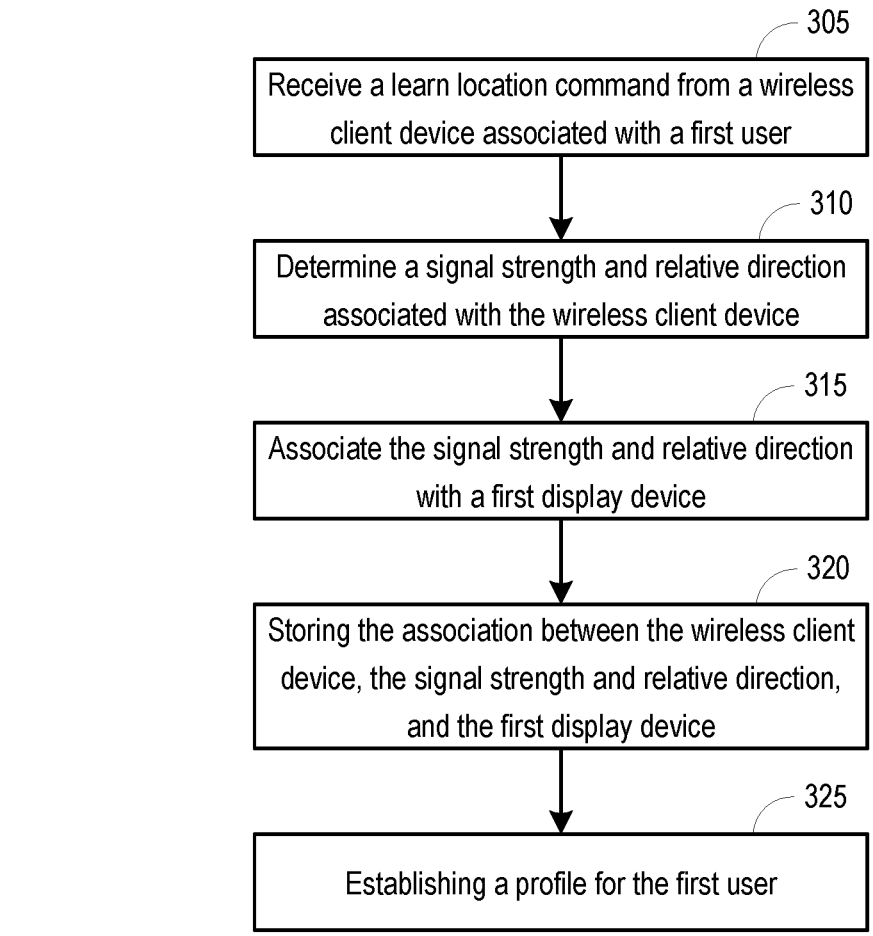
FIG. 3 is a flowchart illustrating an example process operable to facilitate the generation of a user profile, the profile including an association between wireless parameters and the location of a wireless client device.

FIG. 3 is a flowchart illustrating an example process 300 operable to facilitate the generation of a user profile, the profile including an association between wireless parameters and the location of a wireless client device. The process 300 may begin at 305, when a learn location command is received from a wireless client device associated with a first user. In embodiments, a GUI/TUI presented to a user on a wireless client device (e.g., client device 105b) may be used to initiate the output of a learn location command from the wireless client device to an access point. The output of the learn location command may be initiated from the wireless client device when the wireless client device is located near in proximity to a first display device. For example, the wireless client device may be located at a position from which the user typically views the first display device. The learn location command may include an identification of the first display device (e.g., 'living room television,' 'bedroom television,' 'office computer,' etc.).

At 310, a signal strength and relative direction associated with the wireless client device may be determined. The signal strength and relative direction associated with the wireless client device may be determined, for example, by the access point 115 of FIG. 1 receiving the learn location command (e.g., at device location learning module 210 of FIG. 2). The strength of the signal between the access point 115 and the wireless client device may be logged and stored (e.g., stored at the location characteristics data store 215 of FIG. 2). The strength of the signal may be a measurement of the strength and direction of a signal received from the wireless client device at one or more antennas associated with the access point 115.

In embodiments, the direction of the wireless client device relative to the access point 115 may be determined based upon signal strength realized at one or more antennas of the access point 115 or may be determined based upon signal strength between the wireless client device and one or more other access points. For example, where the access point includes a multiple input/multiple output (MIMO) antenna configuration (e.g., 2×2, 3×3, 4×4, etc.), the strength of a signal received from the wireless client device at one or more of the receive antennas may be used by the device location learning module 210 to determine the relative direction of the wireless client device. Where the access point includes a single input/single output (SISO) antenna configuration (e.g., 1×1), the strength of the signal received from the wireless client device at the receive antenna of the access point 115 may be coupled with the strength of a signal between the access point 115 and one or more other access points and the strength of a signal between the wireless client device and each of the one or more other access points to determine the relative direction of the wireless client device. The direction of the wireless client device relative to the access point 115 may be logged at the access point 115 as the strength of a signal received from the wireless client device across at least two antennas associated with the access point 115 or the strength of a signal received from the wireless client device across at least one antenna associated with the access point 115 and at least one antenna associated with another access point.

At 315, the signal strength and relative direction observed for the wireless client device may be associated with the first display device. The logged signal strength and relative direction (e.g., signal strength at the plurality of antennas) may be associated with the wireless client device from which the learn location command is received, a first user associated with the wireless client device, and a first display device identified within the learn location command, and the association between the signal strength, relative direction, wireless client device, first user, and first display device may be stored, for example, at the access point 115 (e.g., at the location characteristics data store 215 of FIG. 2) at 320.

At 325, a profile may be established for the first user. A profile for the first user may be established and stored, for example, at the access point 115 (e.g., at the device profile data store 225 of FIG. 2). The profile for the first user may include personal information associated with the first user (e.g., name, gender, age, etc.), preferences associated with the first user (e.g., favorite channels, shows, media genres, etc.), privileges afforded the first user (e.g., enable/disable parental control, ability to make PPV or VOD purchases, etc.), and/or other information.

Figure 4:
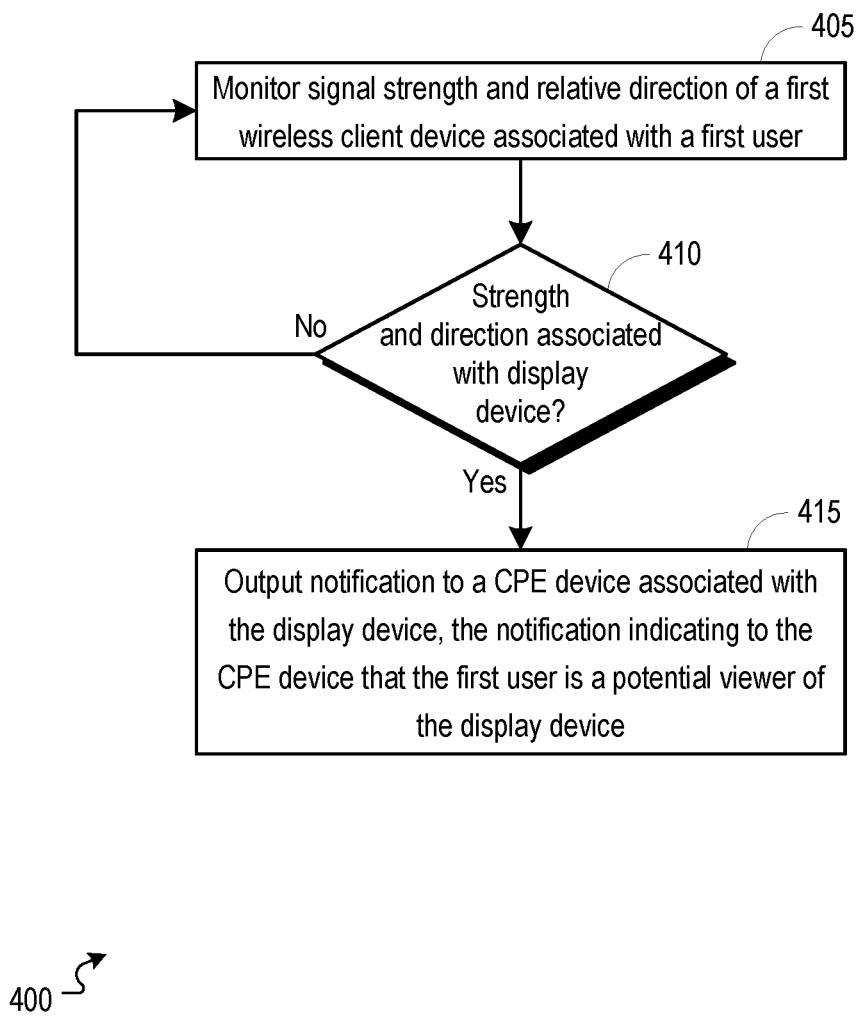
FIG. 4 is a flowchart illustrating an example process operable to facilitate an identification of a viewer based upon the proximity of an associated wireless device to an access point.

FIG. 4 is a flowchart illustrating an example process 400 operable to facilitate an identification of a viewer based upon the proximity of an associated wireless device to an access point. The process 400 may begin at 405, where a signal strength and relative direction of a first wireless client device associated with a first user is monitored. In embodiments, one or more access points may monitor the strength of a signal received from a wireless client device, and a relative location of the wireless client device may be determined based on the strength of a signal received from the wireless client device across at least two antennas (e.g., either antennas located at a single access point or multiple access points). It should be understood that various types of signals received from a wireless client device may be measured to determine a signal strength and relative direction of the wireless client device.

At 410, the determination may be made whether the monitored signal strength and relative direction of the wireless client device is associated with a display device. In embodiments, the access point (e.g., the device location monitor 220 of FIG. 2) may compare the monitored signal strength and relative direction of the wireless client device to one or more previously logged and stored signal strengths and relative directions for the wireless client device, wherein the previously logged and stored signal strengths and relative directions are associated with one or more display devices. For example, an association between the wireless client device, a signal strength between the wireless client device and an access point, a relative direction of the wireless client device, a user, and a display device may be stored at the location characteristics data store 215 of FIG. 2. The direction of the wireless client device with respect to an access point may be stored within the location characteristics data store 215 of FIG. 2 as a signal strength between the wireless client device and at least two antennas. If the monitored signal strength and relative direction of the wireless client device is not associated with a display device, the access point may continue to monitor the signal strength and relative direction of the first wireless client device at 405. It should be understood that a display device may be associated with a range of signal strengths such that the determination may be made that a user is likely to be near in proximity to a display device when the determined signal strength and relative direction of the associated wireless client device is within a certain threshold of the signal strength and relative direction that is logged at the location characteristics data store 215 of FIG. 2.

If, at 410, the determination is made that the monitored signal strength and relative direction of the first wireless client device is associated with a display device, the process 400 may proceed to 415. At 415, a notification may be output to a CPE device associated with the display device, wherein the notification indicates to the CPE device that the first user is a potential viewer of the display device. For example, an access point (e.g., access point 115 of FIG. 1) may output a notification to a CPE device (e.g., STB 120 or gateway device) that is delivering media to the display device (e.g., television 105a, mobile device 105b, computer 105c, etc.). In embodiments, the notification may identify the first user and may include personal information associated with the first user (e.g., name, gender, age, etc.), preferences associated with the first user (e.g., favorite channels, shows, media genres, etc.), privileges afforded the first user (e.g., enable/disable parental control, ability to make PPV or VOD purchases, etc.), and/or other information. The CPE device may modify delivery of media to the display device in response to the notification received from the access point. For example, the CPE device may modify the media delivered (e.g., targeted advertisement content), update user interfaces (e.g., guides and favorites lists may be updated according to preferences of the first user), and disable/enable certain features (e.g., parental controls, purchasing options) according to privileges afforded the first user.

Figure 5:
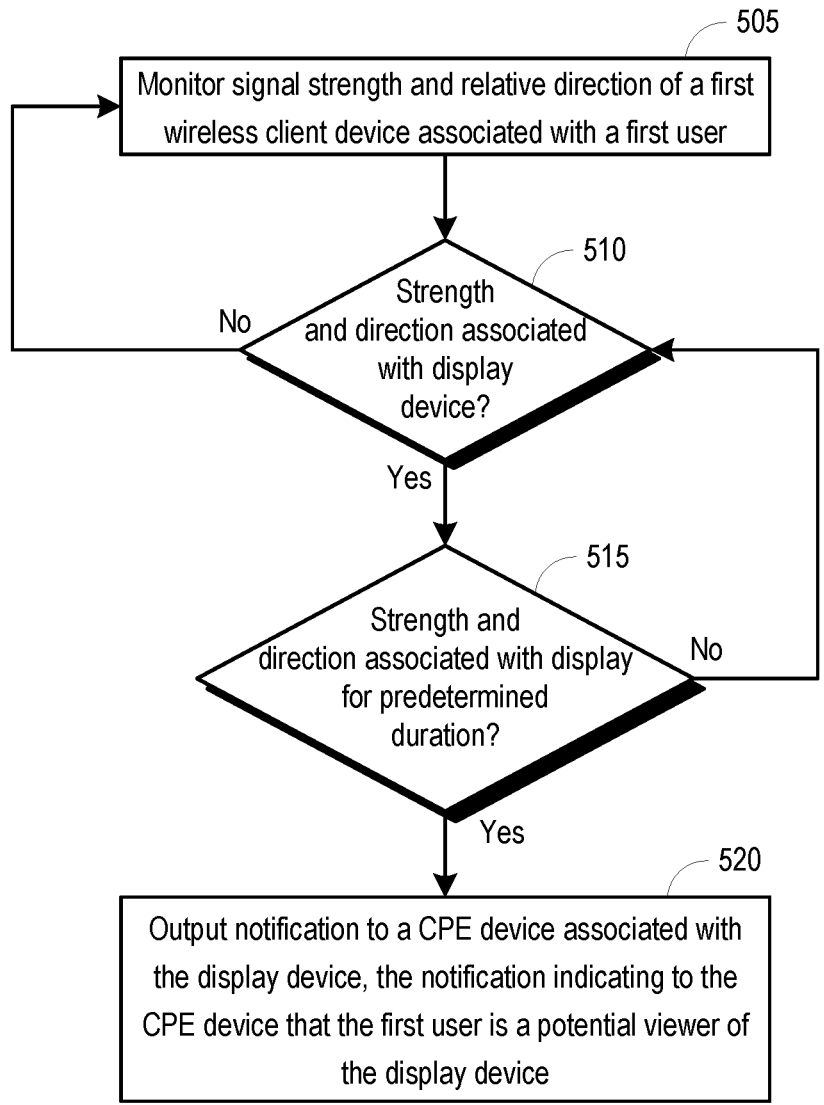
FIG. 5 is a flowchart illustrating an example process operable to facilitate an identification of a viewer based upon the duration of an associated wireless device's proximity to an access point.

FIG. 5 is a flowchart illustrating an example process 500 operable to facilitate an identification of a viewer based upon the duration of an associated wireless device's proximity to an access point. The process 500 may begin at 505, where a signal strength and relative direction of a first wireless client device associated with a first user is monitored. In embodiments, one or more access points may monitor the strength of a signal received from a wireless client device, and a relative location of the wireless client device may be determined based on the strength of a signal received from the wireless client device across at least two antennas (e.g., either antennas located at a single access point or multiple access points).

At 510, the determination may be made whether the monitored signal strength and relative direction of the wireless client device is associated with a display device. In embodiments, the access point (e.g., the device location monitor 220 of FIG. 2) may compare the monitored signal strength and relative direction of the wireless client device to one or more previously logged and stored signal strengths and relative directions for the wireless client device, wherein the previously logged and stored signal strengths and relative directions are associated with one or more display devices. For example, an association between the wireless client device, a signal strength between the wireless client device and an access point, a relative direction of the wireless client device, a user, and a display device may be stored at the location characteristics data store 215 of FIG. 2. The direction of the wireless client device with respect to an access point may be stored within the location characteristics data store 215 of FIG. 2 as a signal strength between the wireless client device and at least two antennas. If the monitored signal strength and relative direction of the wireless client device is not associated with a display device, the access point may continue to monitor the signal strength and relative direction of the first wireless client device at 505.

If, at 510, the determination is made that the monitored signal strength and relative direction of the first wireless client device is associated with a display device, the process 500 may proceed to 515. At 515, a determination may be made whether the signal strength and relative direction of the first wireless client device has been associated with the display device for a predetermined duration. The determination whether the signal strength and relative direction of the first wireless client device has been associated with the display device for a predetermined duration may be made, for example, by the access point (e.g., at a device location monitor 220 of FIG. 2). In embodiments, when the determination is made that the monitored signal strength and relative direction of the first wireless client device is associated with a display device, the device location monitor 220 can start a timer of a predetermined duration (e.g., thirty seconds, one minute, two minutes, etc.), and at the expiration of the timer, if the monitored signal strength and relative direction of the first wireless client device is still associated with a display device, then the determination may be made that the signal strength and direction have been associated with the display device for a predetermined duration. If the determination is made that the signal strength and relative direction of the first wireless client device have not been associated with the display device for a predetermined duration, the process 500 may return to 510.

If, at 515, the determination is made that the signal strength and relative direction of the first wireless client device have been associated with the display device for a predetermined duration, the process 500 may proceed to 520. At 520, a notification may be output to a CPE device associated with the display device, wherein the notification indicates to the CPE device that the first user is a potential viewer of the display device. For example, an access point (e.g., access point 115 of FIG. 1) may output a notification to a CPE device (e.g., STB 120 or gateway device) that is delivering media to the display device (e.g., television 105a, mobile device 105b, computer 105c, etc.). In embodiments, the notification may identify the first user and may include personal information associated with the first user (e.g., name, gender, age, etc.), preferences associated with the first user (e.g., favorite channels, shows, media genres, etc.), privileges afforded the first user (e.g., enable/disable parental control, ability to make PPV or VOD purchases, etc.), and/or other information. The CPE device may modify delivery of media to the display device in response to the notification received from the access point. For example, the CPE device may modify the media delivered (e.g., targeted advertisement content), update user interfaces (e.g., guides and favorites lists may be updated according to preferences of the first user), and disable/enable certain features (e.g., parental controls, purchasing options) according to privileges afforded the first user.

Figure 6:
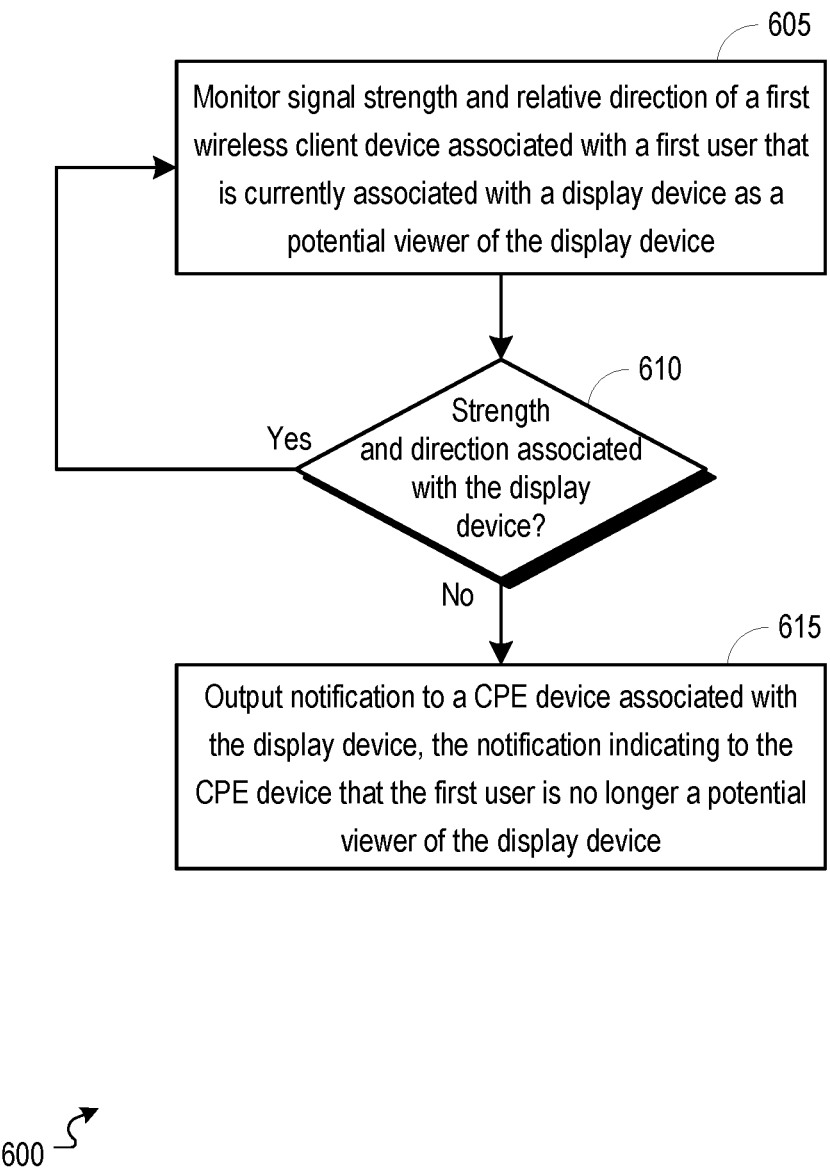
FIG. 6 is a flowchart illustrating an example process operable to facilitate an identification of viewer movement based upon the proximity of an associated wireless device to an access point.

FIG. 6 is a flowchart illustrating an example process 600 operable to facilitate an identification of viewer movement based upon the proximity of an associated wireless device to an access point. The process 600 may begin at 605, where a signal strength and relative direction of a first wireless client device associated with a first user is monitored. The signal strength and relative direction of the first wireless client device may be monitored while the first user is associated with a display device as a potential viewer of the display device. For example, a CPE device (e.g., STB 120 of FIG. 1, gateway device, etc.) delivering media to the display device, or the display device itself, may have previously been notified that the first user is a potential viewer of the display device based upon an association between the signal strength and relative direction of the first wireless client device and the display device. In embodiments, one or more access points may monitor the strength of a signal received from a wireless client device, and a relative location of the wireless client device may be determined based on the strength of a signal received from the wireless client device across at least two antennas (e.g., either antennas located at a single access point or multiple access points).

At 610, a determination may be made whether the monitored signal strength and relative direction of the wireless client device is still associated with the display device. In embodiments, the access point (e.g., the device location monitor 220 of FIG. 2) may compare the monitored signal strength and relative direction of the wireless client device to a previously logged and stored signal strength and relative direction for the wireless client device, wherein the previously logged and stored signal strength and relative direction is associated with the display device. For example, an association between the wireless client device, a signal strength between the wireless client device and an access point, a relative direction of the wireless client device, a user, and a display device may be stored at the location characteristics data store 215 of FIG. 2. The direction of the wireless client device with respect to an access point may be stored within the location characteristics data store 215 of FIG. 2 as a signal strength between the wireless client device and at least two antennas. If the monitored signal strength and relative direction of the wireless client device is still associated with the display device, the access point may continue to monitor the signal strength and relative direction of the first wireless client device at 605.

If, at 610, the determination is made that the monitored signal strength and relative direction of the first wireless client device is no longer associated with the display device, the process 600 may proceed to 615. At 615, a notification may be output to a CPE device associated with the display device, wherein the notification indicates to the CPE device that the first user is no longer a potential viewer of the display device. For example, an access point (e.g., access point 115 of FIG. 1) may output a notification to a CPE device (e.g., STB 120 or gateway device) that is delivering media to the display device (e.g., television 105a, mobile device 105b, computer 105c, etc.). The CPE device may modify delivery of media to the display device in response to the notification received from the access point. For example, the CPE device may modify the media delivered (e.g., targeted advertisement content), update user interfaces (e.g., guides and favorites lists may be updated according to general or global settings), and disable/enable certain features (e.g., parental controls, purchasing options) according to general or global settings.

Figure 7:
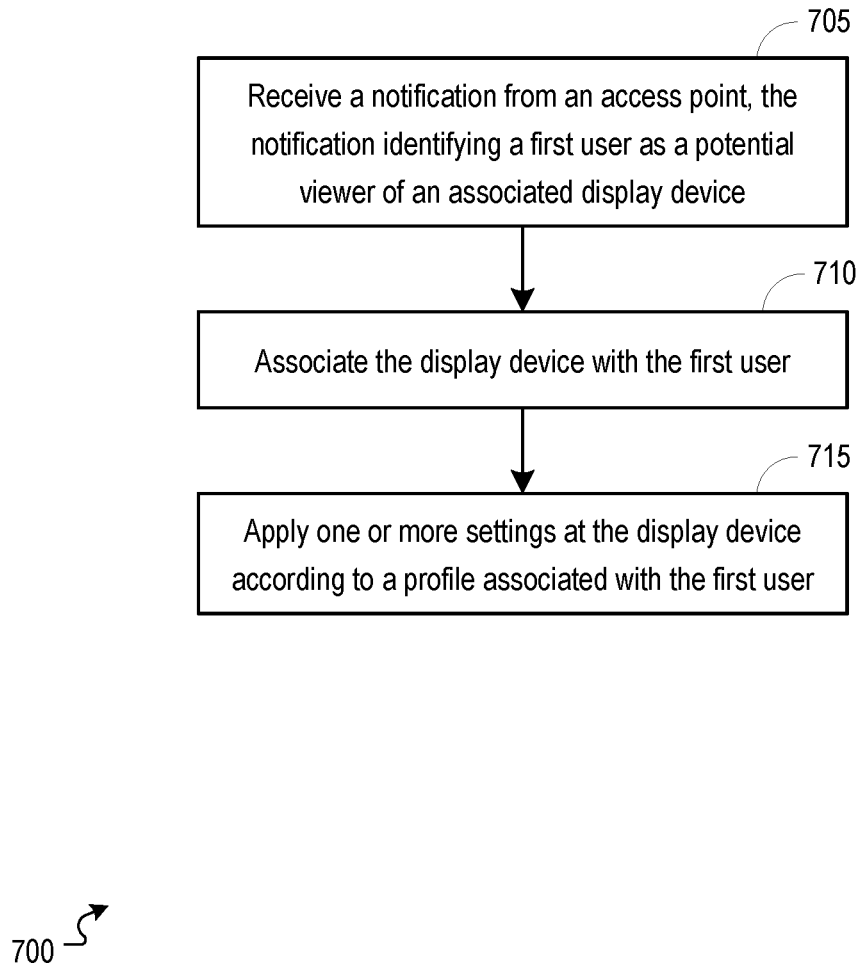
FIG. 7 is a flowchart illustrating an example process operable to facilitate a modification of media delivery settings based upon an identification of a potential viewer of a display device.

FIG. 7 is a flowchart illustrating an example process 700 operable to facilitate a modification of media delivery settings based upon an identification of a potential viewer of a display device. The process 700 may begin at 705, where a notification is received from an access point, the notification identifying a first user as a potential viewer of an associated display device. The notification may be received at a CPE device (e.g., STB 120 of FIG. 1, gateway device, etc.) delivering media to the display device, or may be received at the display device itself. The first user may be identified as a potential viewer of the display device based upon a monitored signal strength and relative direction of a first wireless client device associated with the first user, wherein the monitored signal strength and relative direction indicates that the first wireless client device is near in proximity to the display device. In embodiments, the notification received from the access point may identify the first user and may include personal information associated with the first user (e.g., name, gender, age, etc.), preferences associated with the first user (e.g., favorite channels, shows, media genres, etc.), privileges afforded the first user (e.g., enable/disable parental control, ability to make PPV or VOD purchases, etc.), and/or other information.

At 710, the display device may be associated with the first user. In embodiments, a CPE device delivering media to the display device, or the display device itself, may update configuration settings to associate the display device with the first user. It should be understood that a display device may be associated with a plurality of users at any given time, and media may be delivered to the display device according to the settings and/or preferences associated with each of the users associated with the display device.

At 715, setting(s) and/or preference(s) associated with the first user may be applied in the delivery of media to the display device. In embodiments, setting(s) and/or preference(s) associated with the first user may be identified from the notification received from the access point (e.g., setting(s) and/or preference(s) stored within a user profile at the device profile data store 225 of FIG. 2). Delivery of media to the display device may be modified in response to the notification received from the access point. For example, a CPE device or the display device itself (e.g., via a media player integrated with the display device) may modify the media delivered (e.g., targeted advertisement content), update user interfaces (e.g., guides and favorites lists may be updated according to preferences associated with the first user), and disable/enable certain features (e.g., parental controls, purchasing options) according to settings or preferences associated with the first user. Where a plurality of users are associated with a display device and conflicts exist between the settings and/or preferences associated with each of the plurality of users, priority levels associated with the users may be used to determine which settings and/or preferences should be applied for the delivery of media to the display device.

Figure 8:
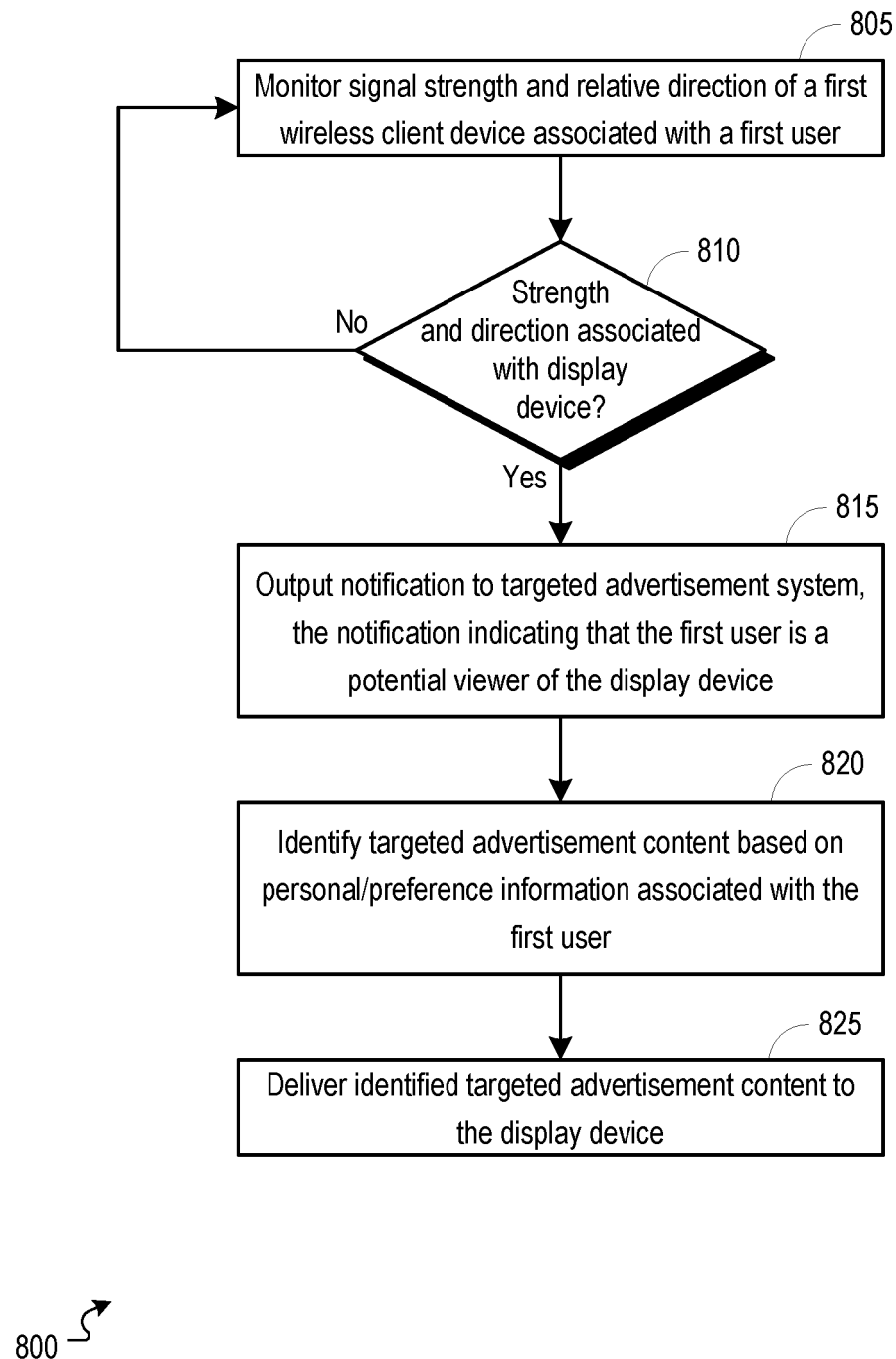
FIG. 8 is a flowchart illustrating an example process operable to facilitate the delivery of targeted advertisement content to a display device based upon an identification of a potential viewer of the display device.

FIG. 8 is a flowchart illustrating an example process 800 operable to facilitate the delivery of targeted advertisement content to a display device based upon an identification of a potential viewer of the display device. The process 800 may begin at 805, where a signal strength and relative direction of a first wireless client device associated with a first user is monitored. In embodiments, one or more access points may monitor the strength of a signal received from a wireless client device, and a relative location of the wireless client device may be determined based on the strength of a signal received from the wireless client device across at least two antennas (e.g., either antennas located at a single access point or multiple access points). The monitored wireless client device may be a device associated with a user for which targeted advertisement information is available. For example, a profile may be created for the first user, wherein the profile includes information such as name, gender, age, media preferences (e.g., favorite programs, channels, genres, etc.), and other information.

At 810, the determination may be made whether the monitored signal strength and relative direction of the wireless client device is associated with a display device. In embodiments, the access point (e.g., the device location monitor 220 of FIG. 2) may compare the monitored signal strength and relative direction of the wireless client device to one or more previously logged and stored signal strengths and relative directions for the wireless client device, wherein the previously logged and stored signal strengths and relative directions are associated with one or more display devices. For example, an association between the wireless client device, a signal strength between the wireless client device and an access point, a relative direction of the wireless client device, a user, and a display device may be stored at the location characteristics data store 215 of FIG. 2. The direction of the wireless client device with respect to an access point may be stored within the location characteristics data store 215 of FIG. 2 as a signal strength between the wireless client device and at least two antennas. If the monitored signal strength and relative direction of the wireless client device is not associated with a display device, the access point may continue to monitor the signal strength and relative direction of the first wireless client device at 805.

If, at 810, the determination is made that the monitored signal strength and relative direction of the first wireless client device is associated with a display device, the process 800 may proceed to 815. At 815, a notification may be output to a targeted advertisement system, wherein the notification indicates that the first user is a potential viewer of the display device. For example, an access point (e.g., access point 115 of FIG. 1) may output a notification to a targeted advertisement system (e.g., targeted advertisement system 135 of FIG. 1) that is configured to deliver advertisement content to the display device. In embodiments, the notification may identify the first user and may include personal information associated with the first user (e.g., name, gender, age, etc.), preferences associated with the first user (e.g., favorite channels, shows, media genres, etc.), viewing habits (e.g., patterns in time and/or duration of program/channel viewing), and/or other information.

At 820, targeted advertisement content may be identified based on personal and/or preference information associated with the first user. In embodiments, a targeted advertisement system (e.g., targeted advertisement system 135 of FIG. 1) may identify targeted advertisement content having one or more parameters matching the personal and/or preference information associated with the first user. For example, targeted advertisement content may be stored within an advertisement content server and may be associated with one or more user parameters (e.g., user age, gender, interests, etc.).

At 825, the identified targeted advertisement content may be delivered to the display device. In embodiments, the targeted advertisement system (e.g., targeted advertisement system 135 of FIG. 1) may add the identified targeted advertisement content to a multimedia stream that is delivered to the display device. For example, the targeted advertisement system may replace generic advertisement content of a multimedia stream with targeted advertisement content, and the modified multimedia stream may be delivered to the access point 115 or CPE device (e.g., STB 120, gateway device, etc.) for output to the display device.

Figure 9:
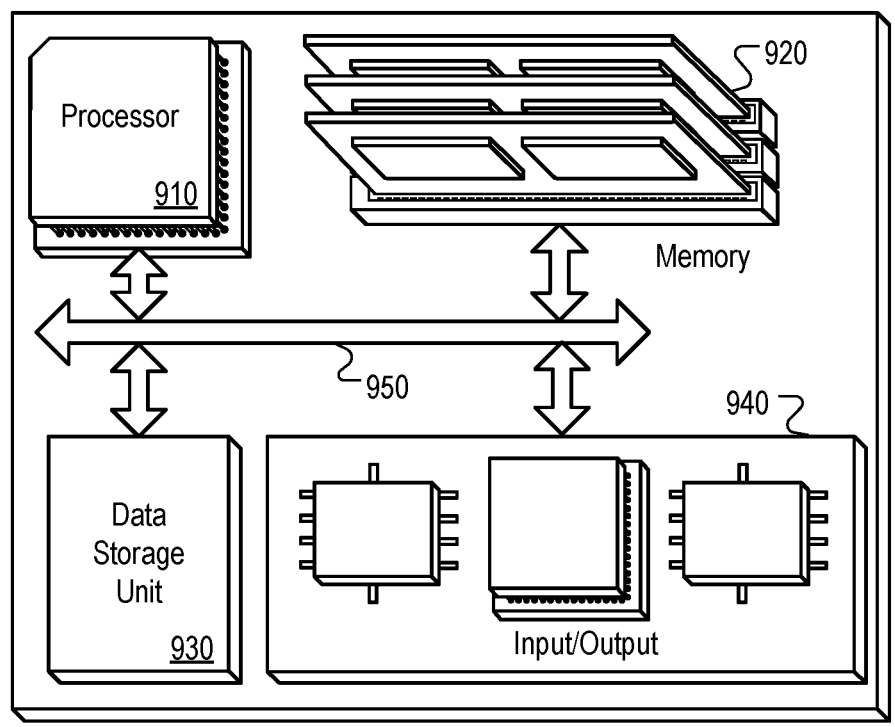
FIG. 9 is a block diagram of a hardware configuration operable to facilitate an identification of a viewer based upon the proximity of an associated wireless device to an access point.

FIG. 9 is a block diagram of a hardware configuration 900 operable to facilitate an identification of a viewer based upon the proximity of an associated wireless device to an access point. The hardware configuration 900 can include a processor 910, a memory 920, a storage device 930, and an input/output device 940. Each of the components 910, 920, 930, and 940 can, for example, be interconnected using a system bus 950. The processor 910 can be capable of processing instructions for execution within the hardware configuration 900. In one implementation, the processor 910 can be a single-threaded processor. In another implementation, the processor 910 can be a multi-threaded processor. The processor 910 can be capable of processing instructions stored in the memory 920 or on the storage device 930.

The memory 920 can store information within the hardware configuration 900. In one implementation, the memory 920 can be a computer-readable medium. In one implementation, the memory 920 can be a volatile memory unit. In another implementation, the memory 920 can be a non-volatile memory unit.

In some implementations, the storage device 930 can be capable of providing mass storage for the hardware configuration 900. In one implementation, the storage device 930 can be a computer-readable medium. In various different implementations, the storage device 930 can, for example, include a hard disk device, an optical disk device, flash memory or some other large capacity storage device. In other implementations, the storage device 930 can be a device external to the hardware configuration 900.

The input/output device 940 provides input/output operations for the hardware configuration 900. In one implementation, the input/output device 940 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a CPE device (e.g., access point 115 of FIG. 1, STB 120 of FIG. 1, gateway device, etc.) or a client device (e.g., television 105a of FIG. 1, mobile device 105b, computer 105c, etc.). In embodiments, the input/output device can include driver devices configured to send communications to, and receive communications from one or more networks (e.g., subscriber network 130 of FIG. 1, WAN 125 of FIG. 1, etc.).

Those skilled in the art will appreciate that the invention improves upon methods and systems for identifying a viewer of a display device. Methods, systems, and computer readable media can be operable to facilitate an identification of a viewer based upon the proximity of an associated wireless device to an access point. An association between a wireless device, user, display device, and a position of the wireless device relative to an access point may be created and stored at the access point. The access point may monitor the position of the wireless device, wherein the position is based on the strength of a signal received from the wireless device at one or more receivers. When the access point determines that a position of the wireless device is associated with a display device, the access point may identify the user of the wireless device as a potential viewer of the display device. Targeted advertisements and set-top box functionality may be configured based on the identification of a viewer of the display device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   determining that a first user is identified as a potential viewer of a display device, wherein the determination that the first user is identified as a potential viewer of the display device is made by:
      receiving, at one or more receivers, a command from a wireless client device, the command instructing the one or more receivers to learn a location of the wireless client device by determining a proximity and a direction of the wireless client device relative to the one or more receivers;
      measuring, in response to the command received from the wireless client device, the strength of a signal between the wireless client device and one or more receivers and the direction of the wireless client device relative to the one or more receivers, wherein the one or more receivers comprise access points, wherein the wireless client device is associated with the first user;
      based upon the measured strength of the signal between the wireless client device and the one or more receivers and the measured direction of the wireless client device relative to a measured signal strength of a plurality of antennas at each of the one or more receivers, determining a position of the wireless client device relative to the one or more receivers by triangulation of the measured signal strength in each antenna of at least a subset of the plurality of antennas of the one or more receivers;
      determining that the position of the wireless client device is in proximity to the display device based on a previous logged location of the wireless client device; and
      identifying the first user as a potential viewer of the display device; and
   in response to the determination that the first user is identified as a potential viewer of the display device, providing information associated with the first user to a media delivery system connected to provide media content to the display device and modifying a delivery of media content to the display device based on first user information sent from the at least one of the one or more receivers, wherein the delivered media includes advertising content.

2. The method of claim 1, wherein the association between the display device and the position of the wireless client device is created and stored at a controller when the signal strength between the wireless client device and one or more receivers is measured and stored, wherein the message comprises an identification of the wireless client device and the identification of the display device.

3. The method of claim 1, wherein modifying the delivery of media to the display device comprises:
   changing content that is output to the display device.

4. The method of claim 1, wherein modifying the delivery of media to the display device comprises:
   updating one or more user interfaces according to preferences associated with the first user.

5. The method of claim 1, wherein modifying the delivery of media to the display device comprises:
   disabling/enabling one or more features according to preferences associated with the first user.

6. The method of claim 1, wherein the delivery of media is modified after the position of the wireless client device has been constant for a predetermined duration of time.

7. The method of claim 1, further comprising: outputting a notification to a targeted advertisement system, wherein the notification identifies the first user as a potential viewer of the display device.

8. The method of claim 1, wherein the delivery of media is modified after the position of the wireless client device has been constant for a predetermined duration of time.

9. An apparatus comprising one or more modules that:
   determine that a first user is identified as a potential viewer of a display device, wherein the determination that the first user is identified as a potential viewer of the display device is made by:
      receiving a command from a wireless client device, the command instructing the apparatus to learn a location of the wireless client device by determining a proximity and a direction of the wireless client device relative to the one or more receivers;
      measuring, in response to the command received from the wireless client device, the strength of a signal between the wireless client device and one or more receivers and the direction of the wireless client device relative to the one or more receivers, wherein the one or more receivers comprise access points, wherein the wireless client device is associated with the first user;
      based upon the measured strength of the signal between the wireless client device and the one or more receivers and the measured direction of the wireless client device relative to a measured signal strength of a plurality of antennas at each of the one or more receivers, determining a position of the wireless client device relative to the one or more receivers by triangulation of the measured signal strength in each antenna of at least a subset of the plurality of antennas of the one or more receivers;
      determining that the position of the wireless client device is in proximity to the display device based on a previous logged location of the wireless client device; and
      identifying the first user as a potential viewer of the display device; and
   in response to the determination that the first user is identified as a potential viewer of the display device, providing information associated with the first user to a media delivery system and modifying a delivery of media to the display device based on content sent from the media delivery system connected to provide media content to the display device, wherein the delivered media includes advertising content.

10. The apparatus of claim 9, wherein the association between the display device and the position of the wireless client device is created and stored at a controller when the signal strength between the wireless client device and one or more receivers is measured and stored, wherein the message comprises an identification of the wireless client device and the identification of the display device.

11. The apparatus of claim 9, wherein modifying the delivery of media to the display device comprises: changing content that is output to the display device.

12. The apparatus of claim 9, wherein modifying the delivery of media to the display device comprises: updating one or more user interfaces according to preferences associated with the first user.

13. The apparatus of claim 9, wherein modifying the delivery of media to the display device comprises:
disabling/enabling one or more features according to preferences associated with the first user.

14. One or more non-transitory computer readable media having instructions operable to cause one or more processors to perform the operations comprising:
determining that a first user is identified as a potential viewer of a display device, wherein the determination that the first user is identified as a potential viewer of the display device is made by:
receiving a command from a wireless client device, the command instructing the one or more processors to learn a location of the wireless client device by determining a proximity and a direction of the wireless client device relative to the one or more processors;
measuring, in response to the command received from the wireless client device, the strength of a signal between the wireless client device and one or more receivers and the direction of the wireless client device relative to the one or more receivers, wherein the one or more receivers comprise access points, wherein the wireless client device is associated with the first user;
based upon the measured strength of the signal between the wireless client device and the one or more receivers and the measured direction of the wireless client device relative to a measured signal strength of a plurality of antennas at each of the one or more receivers, determining a position of the wireless client device relative to the one or more receivers by triangulation of the measured signal strength in each antenna of at least a subset of the plurality of antennas of the one or more receivers;
determining that the position of the wireless client device is in proximity to the display device based on a previous logged location of the wireless client device; and
identifying the first user as a potential viewer of the display device; and
in response to the determination that the first user is identified as a potential viewer of the display device, providing information associated with the first user to a media delivery system connected to provide media content to the display device and modifying a delivery of media content to the display device based on first user information sent from the at least one of the one or more receivers, wherein the delivered media includes advertising content.

15. The one or more non-transitory computer-readable media of claim 14, wherein the association between the display device and the position of the wireless client device is created and stored at a controller when the signal strength between the wireless client device and one or more receivers is measured and stored, wherein the message comprises an identification of the wireless client device and the identification of the display device.

16. The one or more non-transitory computer-readable media of claim 14, wherein modifying the delivery of media to the display device comprises: changing content that is output to the display device.

17. The one or more non-transitory computer-readable media of claim 14, wherein modifying the delivery of media to the display device comprises: updating one or more user interfaces according to preferences associated with the first user.

18. The one or more non-transitory computer-readable media of claim 14, wherein modifying the delivery of media to the display device comprises:
disabling/enabling one or more features according to preferences associated with the first user.

19. The one or more non-transitory computer-readable media of claim 14, wherein the delivery of media is modified after the position of the wireless client device has been constant for a predetermined duration of time.

20. The one or more non-transitory computer-readable media of claim 14, wherein the instructions are further operable to cause one or more processors to perform the operations comprising:
outputting a notification to a targeted advertisement system, wherein the notification identifies the first user as a potential viewer of the display device.

\* \* \* \* \*